Feb. 4, 1936. G. GASTRICH Re. 19,843

MECHANISM FOR KNITTING FULL FASHIONED HOSIERY

Original Filed Nov. 11, 1931 3 Sheets-Sheet 1

INVENTOR:
Gustav Gastrich,
BY Alfred E. Jochinger
ATTORNEY.

MECHANISM FOR KNITTING FULL FASHIONED HOSIERY

Original Filed Nov. 11, 1931 3 Sheets-Sheet 2

INVENTOR:
Gustav Gastrich,
BY Alfred E. Ischinger,
ATTORNEY.

Feb. 4, 1936. G. GASTRICH Re. 19,843

MECHANISM FOR KNITTING FULL FASHIONED HOSIERY

Original Filed Nov. 11, 1931 3 Sheets-Sheet 3

INVENTOR:
Gustav Gastrich,
BY Alfred E. Schinger,
ATTORNEY.

Reissued Feb. 4, 1936 Re. 19,843

UNITED STATES PATENT OFFICE 19,843

MECHANISM FOR KNITTING FULL-FASHIONED HOSIERY

Gustav Gastrich, Wyomissing, Pa., assignor to Textile Machine Works, Wyomissing, Pa., a corporation of Pennsylvania Original No. 1,941,296, dated December 26, 1933, Serial No. 574,245, November 11, 1931. Application for reissue September 11, 1935, Serial No. 40,160

18 Claims. (Cl. 66—89)

This invention relates to novel and improved mechanism for knitting fashioned fabrics such as full fashioned hosiery.

Heretofore in knitting full fashioned hosiery it has been customary to fashion or narrow the fabric by shifting or transferring loops at the fabric edges a distance of two needles. This has been considered desirable in order to produce a uniform selvage edge to facilitate subsequent seaming. However, it has been found that this two needle movement often results in excessive stretching of the yarn with consequent weakening of the fabric. This two needle movement also often results in bending of the narrowing points and needles, causing imperfect registration thereof and resulting in imperfect loop transfers and frequent dropping of loops when subsequent narrowings are effected.

These defects are often not apparent in inspections at various manufacturing stages because of the gummed condition of the fabric before the stocking is completed. As a result of the stretching of the yarn, stressing of the fabric and the possibility of the occurrence of dropped loops, runners are apt to develop when the stocking is subjected to stretching when worn.

An object of the present invention is to obviate these disadvantages and in carrying out my invention I effect the fashioning by transferring the loops so that the yarn is not unduly stressed and the narrowing points and needles are not bent and misalined.

Figure 1:
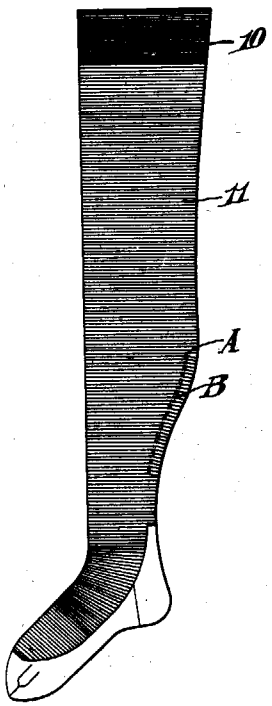
Figure 1 is a side view of a stocking made in accordance with my invention.

In accordance with my improved method of knitting the full fashioned stocking shown in Figure 1, the welt 10 is produced in well known manner on a full fashioned knitting machine. The leg part 11 is also knit as heretofore except that in fashioning instead of moving all the transferred loops inwardly two needles at each edge of the fabric, as heretofore, the loops 12 (Fig. 2) transferred by the narrowing points are all moved inwardly a distance of one needle at each edge of the fabric, and part of the transferred loops are then moved inwardly an additional distance of one needle at each edge of the fabric.

I have diagrammatically illustrated one method of accomplishing narrowing according to my invention in Figures 3 to 7 which indicate a complete narrowing cycle and upon consideration of which my improved method will be readily understood by those skilled in the art. The numeral 13 designates the ordinary thread carrier rod used in laying the yarn to produce the fabric and 14, 15 are the end stops for rod 13, these stops being mounted on oppositely threaded portions of spindle 16 and operated on rotation of the latter. The usual narrowing rods 17, 18 have mounted thereon narrowing points 20 and are yieldingly held in engagement with the narrowing rod end stops 21, 22 and 23, 24 respectively, by springs 25 and 26, these stops being operated by spindle 27. In Figs. 3 to 7, the dot-dash lines designated 0, 2, 4, 6 indicate carrier rod end stop positions separated by two needle spaces while the lines *a, b, c, d, e* designate positions for the narrowing rod end stops spaced by the distance between successive needles.

Figure 3:
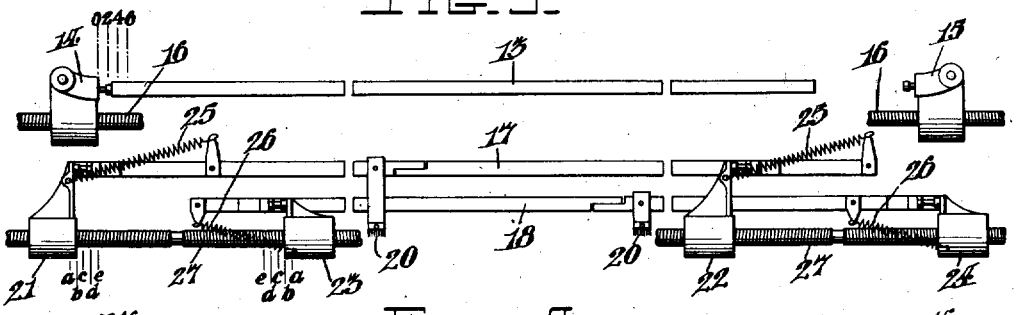
Figures 3 to 7 are diagrammatic views illustrating the various positions of the narrowing rod and carrier rod end stops of a full fashioned knitting machine in the various stages of a narrowing cycle performed according to my invention.

At the beginning of a narrowing operation, as shown in Fig. 3 the end stop 14 for the carrier rod 13 is positioned at the point 0 on spindle 16 while end stops 21 and 23 for narrowing rods 17 and 18 are located at the points *b*, it being understood that carrier rod end stop 15 and narrowing rod end stops 22 and 24 are correspondingly located.

Figure 4:
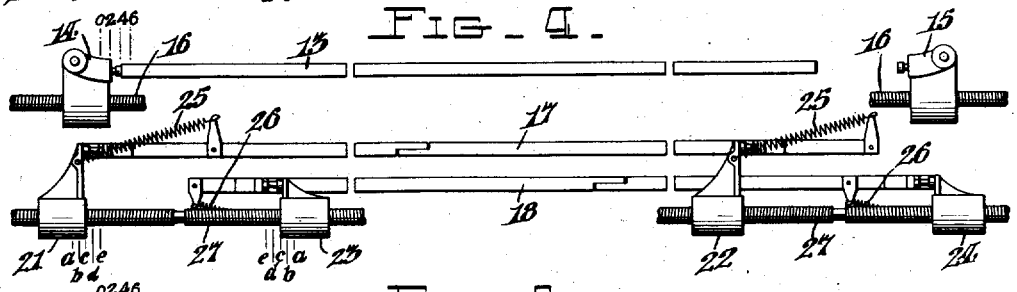
Figure 6:
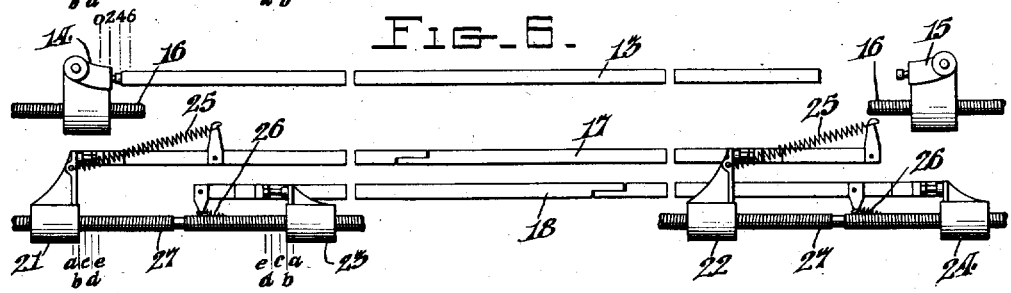
Figure 7:
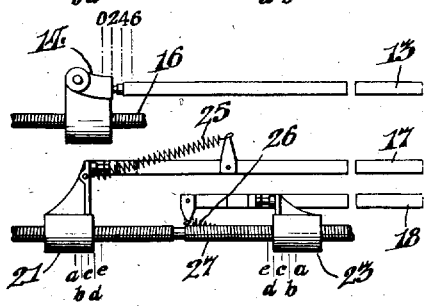

The narrowing rods 17, 18 are moved downwardly in unison to cause narrowing points 20 to engage loops at a desired point of narrowing, and are then raised and the narrowing and rod end stops 21, 24 and 22, 23 moved inwardly and outwardly, respectively, a distance of only one needle space, as indicated in Fig. 4 by the positioning of stops 21 and 23 at the points *c*. Simultaneously with the movement of the narrowing rod end stops, carrier rod end stops 14 and 15 are moved inwardly a distance of two needle spaces, as indicated by the alinement of stop 14 with the point 2 in Fig. 4. The carrier rod end stops remain in this position throughout the subsequent stages of the narrowing cycle as indicated in Figs. 5 to 7.

The narrowing rods are lowered to transfer the shifted loops to needles spaced one needle inwardly of the needles from which the loops were taken and the narrowing rods are again raised to disengage the fabric.

Figure 5:
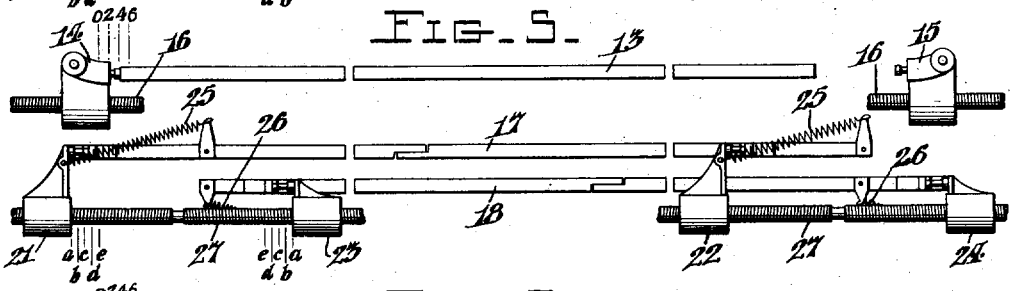

When the narrowing points 20 and rods are raised, the narrowing rod end stops 21, 24 and 22, 23 are moved, outwardly and inwardly respectively, a distance of at least two needles, as indicated by the alinement of stops 21 and 23 with the points *a* Fig. 5, thereby moving the narrowing points outwardly the same distance. Narrowing rods 17, 18 are again lowered to cause narrowing points 20 to engage only a few of the loops previously shifted and transferred. The narrowing rods are raised and the end stops 21, 24 and 22, 23 are again moved, inwardly and outwardly respectively, a distance of only one needle space to the points *b*, as indicated in Fig. 6. The narrowing points are then lowered to transfer the shifted loops to the needles, the needles to which loops are transferred being in the specific embodiment illustrated in the drawings, a needle space inward of those from which the loops were taken. The narrowing rods are again raised and the end strops 21, 24 and 22, 23 are preferably moved inwardly and outwardly, respectively, a distance equal to that of the foregoing outward movement of the narrowing points, which, in the embodiment shown, is a distance of two needle spaces to the points *d*, Fig. 7, so that narrowing rod end stops 21—24 are again in the same positions relative to carrier rod end stops 14, 15, as in Fig. 3 and the narrowing points 20 are properly positioned for a subsequent and similar narrowing operation.

Figures 8, 9:
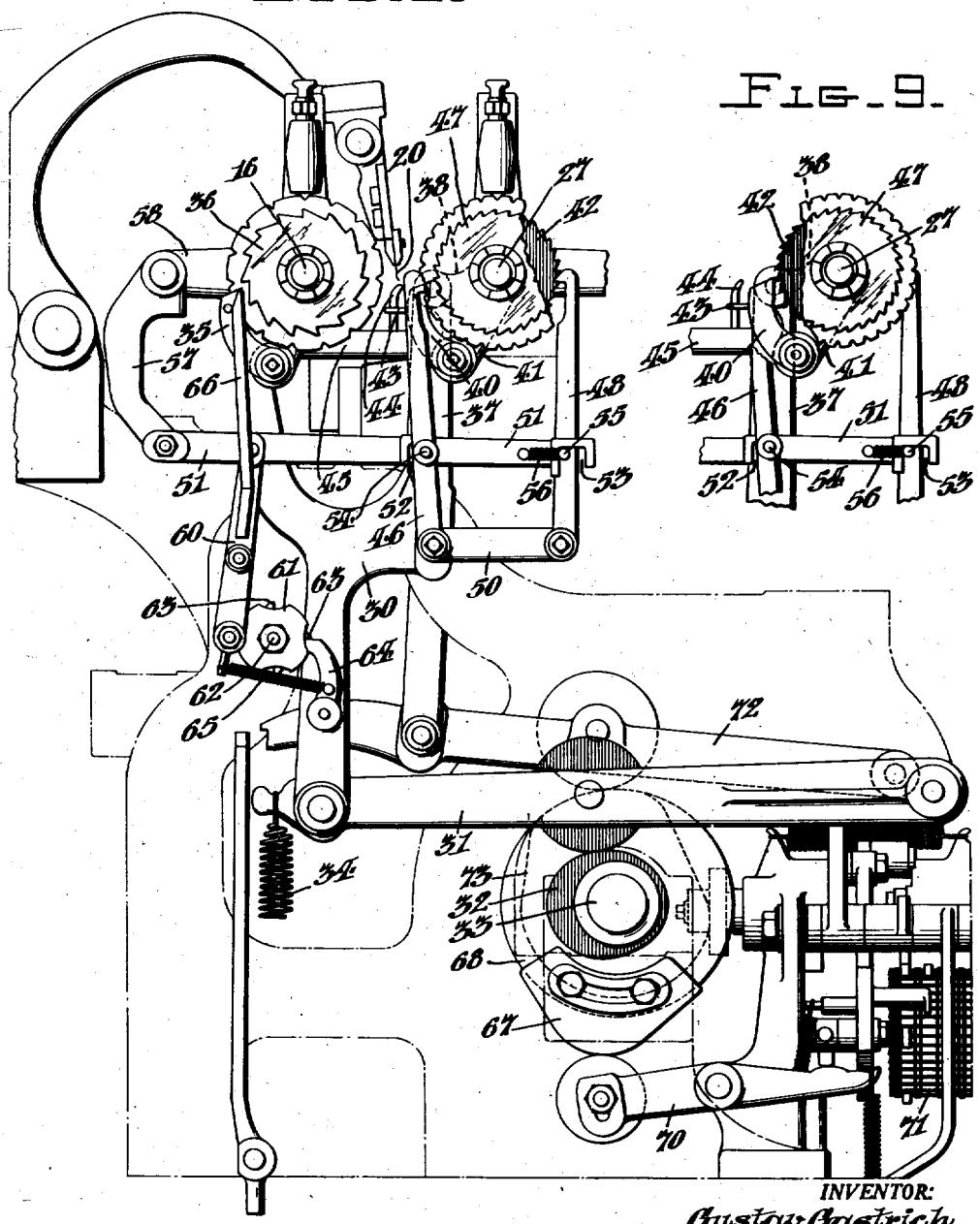
Figure 8 is an end view of certain parts of a well known full fashioned stocking knitting machine embodying improved mechanism for carrying out my invention.
Figure 9 is a detail view of part of the mechanism shown in Fig. 8.

In Figure 8 I have illustrated one form of mechanism which I have found suitable for operating the end stops for the thread carrier rod and the narrowing rods in accordance with my novel narrowing method as described above. A vertically reciprocable member 30 is connected to a rocker arm 31 which is operable by a cam 32 on the usual cam shaft 33 and by a spring 34, for effecting reciprocation of member 30. Member 30 carries a pawl 35 biased by a spring into engagement with a ratchet 36 secured to thread carrier rod spindle 16. The part 37 of member 30 is connected to the arm 38 of a bell crank rotatively mounted on narrowing rod spindle 27 for causing a spring biased pawl 40 mounted on bell crank arm 41 to engage and operate a ratchet 42 fixed on spindle 27. Pawl 40 is provided with a hook 43 cooperating with a pin 44 on a support 45 for limiting the operation of ratchet 42 and spindle 27 by the pawl. Also mounted on member 30 is a pivoted pawl 46 for engaging a second ratchet 47 on spindle 27 to operate the latter reversely to its operation by pawl 40 and another pawl 48 engageable with ratchet 42 at a point opposite pawl 40. Pawl 48 is pivotally mounted on an extension 50 of pawl 46.

Pawls 46 and 48 are movable into and out of operative relation with ratchets 47 and 42, respectively, by means of a slide 51 having notches 52 and 53 provided with shoulders engaging studs 54 and 55 on the pawls for moving the latter. A spring 56 connected to slide 51 and stud 55 of pawl 48 biases the latter into engagement with ratchet 42. Slide 51 is supported by a link 57 pivotally connected thereto and to a member 58. Slide 51 is connected to and operable horizontally by a lever 60 pivoted intermediate its ends and having a roller engaging a Maltese cross-shaped cam 61 fixed to a stub shaft 62. A ratchet 63 secured to shaft 62 is intermittently operable by a pawl 64 mounted on repiprocating member 30, a single spring 65 between lever 60 and pawl 64 maintaining the lever roller and the pawl engaged respectively with the Maltese cam and its associated ratchet. Lever 60 is also provided with a pawl lifter 66 for controlling the engagement of pawl 35 with ratchet 36 on carrier rod spindle 16.

As cam shaft 33 rotates, a segment 67 mounted at the side of a cam 68 operates a rocking arm 70 to intermittently advance a pattern chain 71 carrying buttons for controlling axial shifting of shaft 33 in well known manner to bring cams 32 and 73 into operating position when narrowing is to be effected. Cam 73 imparts motion to a rocking lever 72 for raising and lowering the narrowing rods 17, 18 and narrowing points 20 while cam 32 controls the reciprocation of member 30.

When cam 32 acts through rocker arm 31 to raise member 30, pawl 64 advances ratchet 63 to turn Maltese cam 61 a single step, an arm or raised portion of the cam moving lever 60 clockwise against the force of spring 65. This movement of lever 60 frees pawl 35 from the restraint of pawl lifter 66 and shifts slide 51 to the right for moving pawl 46 into operative relation with ratchet 47 and pawl 48 away from engaging relation with ratchet 42.

As member 30 continues its upward movement pawl 35 acts through ratchet 36 to turn spindle 16 for moving carrier rod end stops 14, 15 inwardly two needle spaces while at the same time pawl 40 engaging ratchet 42 turns narrowing rod spindle 27. Pawl 35 moved by member 30 turns shaft 16 an amount corresponding to two needle spaces and although pawl 40 is moved a like amount by member 30 the hook 43 and pin 44 hold pawl 40 inactive during part of the movement. Consequently, ratchet 42 is operated to move the narrowing rod end stops 21, 24 and 22, 23, inwardly and outwardly respectively, a distance of only one needle space so that narrowing points 20 are shifted one needle space inwardly.

When spring 34 acts to move member 30 downwardly, pawls 35 and 40 move reversely and idly over ratchets 36 and 42 but pawl 46, being engaged with ratchet 47, rotates spindle 27 in the reverse direction moving the narrowing rod end stops 21, 24 and 22, 23, outwardly and inwardly respectively, a distance of two needle spaces so that narrowing points 20 are shifted two needle spaces outwardly.

When the narrowing points 20 have been lowered to engage the fabric and raised to transfer the engaged loops, the upward movement of reciprocative member 30 by cam 32 causes pawl 64 to turn Maltese cam 61 another step alining a recessed portion between arms thereof with the roller on lever 60. Inasmuch as spring 65 acts to maintain the roller of lever 60 against cam 61 the lever is rocked counter-clockwise causing pawl lifter 66 to move pawl 35 away from ratchet 36 and moving slide 51 to the left thus disengaging pawl 46 from ratchet 47 and positioning the shoulder of notch 53 so that spring 56 may cause pawl 48 to engage ratchet 42.

During the continued upward movement of member 30, pawl 40 again turns spindle 27 to move narrowing rod end stops 21, 24 and 22, 23, inwardly and outwardly respectively, a distance of one needle space. Pawl 35 is held by lifter 66 and is ineffective to turn shaft 16, and the carrier rod stops remain in their shifted position.

The narrowing rods 17, 18 and points 20 are lowered to transfer the shifted loops and then raised from the fabric and as spring 34 moves member 30 downwardly pawl 48 acts to turn spindle 27 so that the narrowing rod end stops 21, 24 and 22, 23 are shifted, inwardly and outwardly respectively, a distance of two needle spaces so that the narrowing points 20 are shifted inwardly two spaces and the narrowing rod end stops 21—24 are again in the same relative positions to the carrier rod end stops 14, 15 as in Fig. 3.

A narrowing cycle is now completed and normal courses are again knit until another narrowing operation is to be performed. In these normal courses the yarn or thread is laid on two fewer needles at each side of the fabric than before the narrowing took place.

Figure 2:
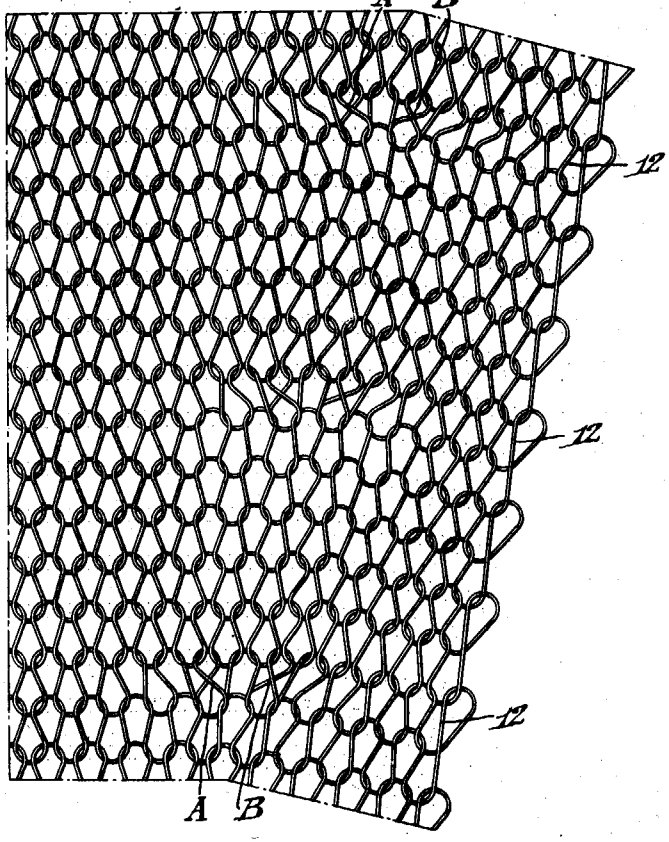
Figure 2 is a fragmentary enlarged view of a flat knitted stocking blank and shows the manner of transferring the loops in carrying out my invention.

In the above described narrowing cycle the narrowing points are lowered to engage a number of fabric loops, then raised to take loops from the needles and on being shifted inwardly are again lowered to transfer the loops to needles each separated by one needle space from the needles from which the loops are taken. Consequently the innermost one A (Fig. 2) of the shifted loops is transferred to a needle already having a loop thereon. When the narrowing points are raised, shifted outwardly two needle spaces, lowered to engage the fabric and again raised, the narrowing points retain fewer loops than in the previous loop transferring operation, these loops comprising the same loops which were previously transferred less two loops which are not engaged because of the two needle outward movement of the narrowing points. When the narrowing points are again shifted inwardly a single needle space and the points lowered to transfer the loops, the innermost loop B is transferred to a needle already having a shifted loop thereon, which needle, in the illustrative form shown in the drawings, is immediately adjacent the other needle having a double loop, including loop A. Thus, as shown in Figs. 1 and 2, the "narrowing marks" resulting from the shifting of loops in narrowing operations comprise two series which are in separate wales of the stocking.

What I claim is:

1. In a full fashioned knitting machine, the combination with a thread carrier spindle and carrier stops controlled thereby and a narrowing point control spindle and narrowing rod stops controlled thereby; of ratchets on said spindles and pawls for individually operating said ratchets; a reciprocative member for actuating said pawls during a narrowing cycle to operate said spindles to impart a predetermined inward movement to the carrier stops and a plurality of one needle inward movements to the narrowing points; a second pawl actuated by said reciprocative member for operating one of the ratchets associated with said narrowing point spindle, to impart, subsequent to one of said one needle inward movements of the points, a predetermined outward movement to the narrowing points; and an additional pawl operable by said reciprocative member for operating one of the narrowing spindle ratchets to actuate said narrowing point spindle reversely to impart an inward movement to the narrowing rod stops for repositioning the latter relative to the carrier stops for the beginning of the next narrowing cycle.

2. In a full fashioned knitting machine having a thread stop carrier spindle and a narrowing point control spindle; a ratchet on said carrier stop spindle; a ratchet on said narrowing rod spindle; individual pawls for operating said ratchets; a reciprocative member for actuating said pawls during each narrowing cycle to operate said spindles to impart a two needle movement to the carrier stops and a plurality of one needle movements to the narrowing points; and a second pawl operable by said member for operating the ratchet associated with said narrowing point spindle to impart a two needle movement to the narrowing points.

3. In a full fashioned knitting machine having carrier rod stops, narrowing rod stops, narrowing points controlled thereby, and spindles for actuating said stops; a ratchet on the carrier rod spindle for imparting a two needle inward movement to said carrier rod stops; a ratchet on the narrowing rod spindle and pawling structure associated therewith for selectively imparting one needle inward movement and a two needle inward movement to said narrowing points; a second ratchet on said narrowing rod spindle for imparting a two needle outward movement to the narrowing points; a reciprocable member; and individual pawls actuated by said member for operating said ratchets to impart movement to said spindles.

4. In a full fashioned knitting machine having a thread stop carrier spindle and a narrowing point control spindle; a ratchet on said carrier stop spindle; a ratchet on said narrowing rod spindle; individual pawls for operating said ratchets; a reciprocative member for actuating said pawls to operate said spindles to impart a two needle movement to the carrier stops and a one needle movement to the narrowing points; a second pawl operable by said member for operating the ratchet associated with said narrowing point spindle to impart a two needle movement to the narrowing points; a second ratchet on said narrowing point spindle; and a pawl operable by said member for operating said second ratchet to actuate said narrowing point spindle reversely to impart a reverse movement of two needles to the narrowing points.

5. In a full fashioned knitting machine having a thread stop carrier spindle and a narrowing point control spindle; a ratchet on said carrier stop spindle; a ratchet on said narrowing rod spindle; individual pawls for operating said ratchets; a reciprocative member for actuating said pawls during a narrowing cycle to operate said spindles to impart a two needle inward movement to the carrier stops and a plurality of one needle inward movements to the narrowing points; a second pawl operable by said member for operating the ratchet associated with said narrowing point spindle to impart a two needle outward movement to the narrowing points; a second ratchet on said narrowing point spindle; and a pawl operable by said member for operating said second ratchet to actuate said narrowing point spindle reversely to impart an inward movement of two needles to the narrowing points.

6. In a full fashioned knitting machine, the combination with a thread carrier spindle and carrier stops controlled thereby, and a narrowing point control spindle and narrowing rod stops controlled thereby; of ratchets on said spindles and pawls for individually operating said ratchets; and a reciprocative member for actuating said pawls during a narrowing cycle to operate said spindles to impart a two needle inward movement to the carrier stops, and successively to impart to the narrowing points a one needle inward movement for a first loop transfer operation, a two needle outward movement for positioning the points relative to loops to be transferred a second time, a one needle inward movement for a second transfer operation, and a two needle inward movement for repositioning the narrowing rod stops relative to the carrier stops.

7. In a full fashioned knitting machine having yarn carrier rod stops, narrowing rod stops, narrowing points controlled thereby, and spindles for actuating said stops; a reciprocative member; means operable by said reciprocative member in a single reciprocation thereof for operating both said spindles to impart a two needle movement to the carrier rod stops for limiting the length of subsequent courses and to simultaneously impart a one needle space movement to the narrowing points for transferring a plurality of loops one needle space and for subsequently imparting a reverse movement of two needle spaces to said narrowing spindle for positioning the narrowing points to engage a portion of said plurality of transferred loops; and means operable by said reciprocative member in a succeeding single reciprocation thereof for operating only the narrowing rod spindle to impart a one needle space movement to the narrowing points for transferring said portion of loops an additional needle space and for subsequently imparting an additional two needle space movement to the narrowing rod stops to position the narrowing points for succeeding narrowing operations.

8. In a full fashioned knitting machine having carrier rod stops, narrowing rod stops, narrowing points controlled thereby, and spindles for actuating said stops; a ratchet on the carrier rod spindle for imparting a two needle inward movement to said carrier rod stops; a ratchet on the narrowing rod spindle for imparting a two needle inward movement to said narrowing points; a second ratchet on said narrowing rod spindle for imparting a two needle outward movement to the narrowing points; a reciprocable member; individual pawls actuated by said member for operating said ratchets to impart movement to said spindles; and means controlled by said member for rendering the pawls associated with the ratchet on said carrier rod spindle and said second mentioned ratchet on said narrowing rod spindle ineffective to impart movement to said spindles and for rendering the pawl associated with said first mentioned ratchet on the narrowing rod spindle effective to cause a two needle movement of the narrowing points on alternate reciprocations of said member.

9. In a full fashioned knitting machine having carrier rod stops, narrowing rod stops, narrowing points controlled thereby, and spindles for actuating said stops; a ratchet on the carrier rod spindle for imparting a two needle inward movement to said carrier rod stops; a ratchet on the narrowing rod spindle for imparting a two needle inward movement to said narrowing points; a second ratchet on said narrowing rod spindle for imparting a two needle outward movement to the narrowing points; a reciprocable member; individual pawls actuated by said member for operating said ratchets to impart movement to said spindles; means controlled by said member for rendering the pawls associated with the ratchet on said carrier rod spindle and said second mentioned ratchet on said narrowing rod spindle ineffective to impart movement to said spindles and for rendering the pawl associated with said first mentioned ratchet on the narrowing rod spindle effective to cause a two needle movement of the narrowing points on alternate reciprocations of said member; and an additional pawl associated with said first mentioned ratchet on said narrowing rod spindle and operable by said member for imparting a one needle movement to said narrowing points on each reciprocation of said member.

10. In a full fashioned knitting machine having carrier rod stops, narrowing rod stops, narrowing points controlled thereby, and spindles for actuating said stops; a ratchet on the carrier rod spindle for imparting a two needle inward movement to said carrier rod stops; a ratchet on the narrowing rod spindle for imparting a two needle inward movement to said narrowing points; a second ratchet on said narrowing rod spindle for imparting a two needle outward movement to the narrowing points; a reciprocable member; individual pawls actuated by said member for operating said ratchets to impart movement to said spindles; means controlled by said reciprocable member for rendering the pawls associated with the ratchet on said carrier rod spindle and the second mentioned ratchet on said narrowing rod spindle effective to operate said spindles to impart a two needle inward movement to the carrier rod stops and a two needle outward movement to the narrowing points and for rendering the pawl associated with said first mentioned ratchet on the narrowing rod spindle ineffective to cause a two needle inward movement of said narrowing points on alternate reciprocations of said member; and an additional pawl associated with the first mentioned ratchet on said narrowing rod spindle and operable by said reciprocable member to impart a one needle inward movement to the narrowing points prior to the said two needle inward movement thereof and subsequent to said two needle outward movement thereof.

11. In a full fashioned knitting machine having carrier rod stops, narrowing rod stops, narrowing points controlled thereby, and spindles for actuating said stops; a ratchet on the carrier rod spindle for imparting a two needle inward movement to said carrier rod stops; a ratchet on the narrowing rod spindle for imparting a two needle inward movement to said narrowing points; a second ratchet on said narrowing rod spindle for imparting a two needle outward movement to the narrowing points; a reciprocable member; individual pawls actuated by said member for operating said ratchets to impart movement to said spindles; and means controlled by said reciprocative member for rendering the pawls associated with the ratchet on said carrier rod spindle and the second mentioned ratchet on said narrowing rod spindle effective to operate said spindles to impart a two needle inward movement to the carrier rod stops and a two needle outward movement to the narrowing points and for rendering the pawl associated with said first mentioned ratchet on the narrowing rod spindle ineffective to cause a two needle inward movement of said narrowing points on alternate reciprocations of said member, and an additional pawl associated with the first mentioned ratchet on said narrowing rod spindle and operable by said reciprocable member to impart one needle inward movement to said narrowing points both prior to and subsequent to the said two needle outward movement thereof.

12. In a full fashioned knitting machine having a thread carrier stop spindle and a narrowing point control spindle; a ratchet on said carrier stop spindle; ratchets on said narrowing rod spindle; individual pawls for operating said ratchets; a reciprocative member for actuating said pawls to operate said spindles to impart a two needle inward movement to the carrier stops and a one needle inward movement to the narrowing points; a second pawl operable by said member for operating one of said ratchets associated with said narrowing point spindle to impart a two needle outward movement to the narrowing points; and means controlled by said reciprocative member for rendering the pawl for the ratchet associated with said carrier stop spindle ineffective to impart movement to said spindle upon operation of the narrowing point spindle by said second pawl.

13. In a full fashioned knitting machine having a thread stop carrier spindle and a narrowing point control spindle; a ratchet on said carrier stop spindle; ratchets on said narrowing rod spindle; individual pawls for operating said ratchets; a reciprocative member for actuating said pawls to operate said spindles to impart a two needle movement to the carrier stops and a one needle movement to the narrowing points; a second pawl operable by said member for operating one of said ratchets associated with said narrowing point spindle to impart a two needle movement to the narrowing points; and means actuated by said reciprocative member for controlling the operative engagement of the pawl associated with said carrier stop spindle ratchet and the pawls associated with the ratchets on the narrowing point spindle to cause a two needle inward movement to be imparted to the carrier rod spindle, a one needle inward movement and a two needle outward movement to be imparted to the narrowing points upon reciprocation of said member.

14. In a full fashioned knitting machine having yarn carriers, narrowing points, separate devices for limiting the travel of said carriers and points; spindles for actuating said limiting devices; a reciprocative member; means operable by said reciprocative member for operating said spindles to impart either simultaneous movement to both of said spindles in one direction or independent movements in either direction to one of said spindles, and a cyclic control device interconnecting said reciprocative member and said spindle operating means to alternately effect said means to bring about a change in the operation thereof on the spindles at each reciprocation of said reciprocative member.

15. In a full fashioned knitting machine having yarn carriers, narrowing points, separate devices for limiting the travel of said carriers and points; spindles for actuating said limiting devices; a reciprocative member; means operable by said reciprocative member for operating said spindles to impart either simultaneous movement to both of said spindles in one direction or independent movements in either direction to one of said spindles, a cyclic control device operated directly through the reciprocation of said reciprocative member, and connections between said device and said spindle operating means whereby to effect a change in the operation of the latter.

16. In a full fashioned knitting machine having yarn carriers, narrowing points, separate devices for limiting the travel of said carriers and points; spindles for actuating said limiting devices; a reciprocative member; means operable by said reciprocative member for operating said spindles to impart either simultaneous movement to both of said spindles in one direction or independent movements in either direction to one of said spindles, and a cyclic control device interconnecting said reciprocative member and said spindle operating means, said device being adapted to bring about a change in the operating condition of said spindle operating means at each complete reciprocation of said reciprocative member.

17. In a full fashioned knitting machine having yarn carriers, narrowing points, separate devices for limiting the travel of said carriers and points; spindles for actuating said limiting devices; a reciprocative member; means operable by said reciprocative member for operating said spindles to impart either simultaneous movement to both of said spindles in one direction or independent selective movements in either direction of the spindle for controlling the narrowing point limiting devices, a cyclic cam control device, means connected to said reciprocative member and adapted to actuate said device upon reciprocation of said member, and means controlled by said cyclic device for effecting the variations in the operation of said spindle operating means.

18. In a full fashioned knitting machine having yarn carriers, narrowing points, separate devices for limiting the travel of said carriers and points; spindles for actuating said limiting devices; a reciprocative member; means operable by said reciprocative member for operating said spindles to impart either simultaneous movement to both of said spindles in one direction or independent movements in either direction to one of said spindles, a cyclic control device operated by connections to said reciprocative member and means operated by said device and connected to said spindle operating means whereby to either rotate both of said spindles simultaneously in one direction or to rotate one of said spindles in either direction and at the same time to disconnect said spindle rotating means from the other spindle.

GUSTAV GASTRICH.